F. A. McKEE & F. R. HOREL.
DRAG SAW MACHINE.
APPLICATION FILED JAN. 25, 1910.
974,168.
Patented Nov. 1, 1910.
4 SHEETS—SHEET 1.
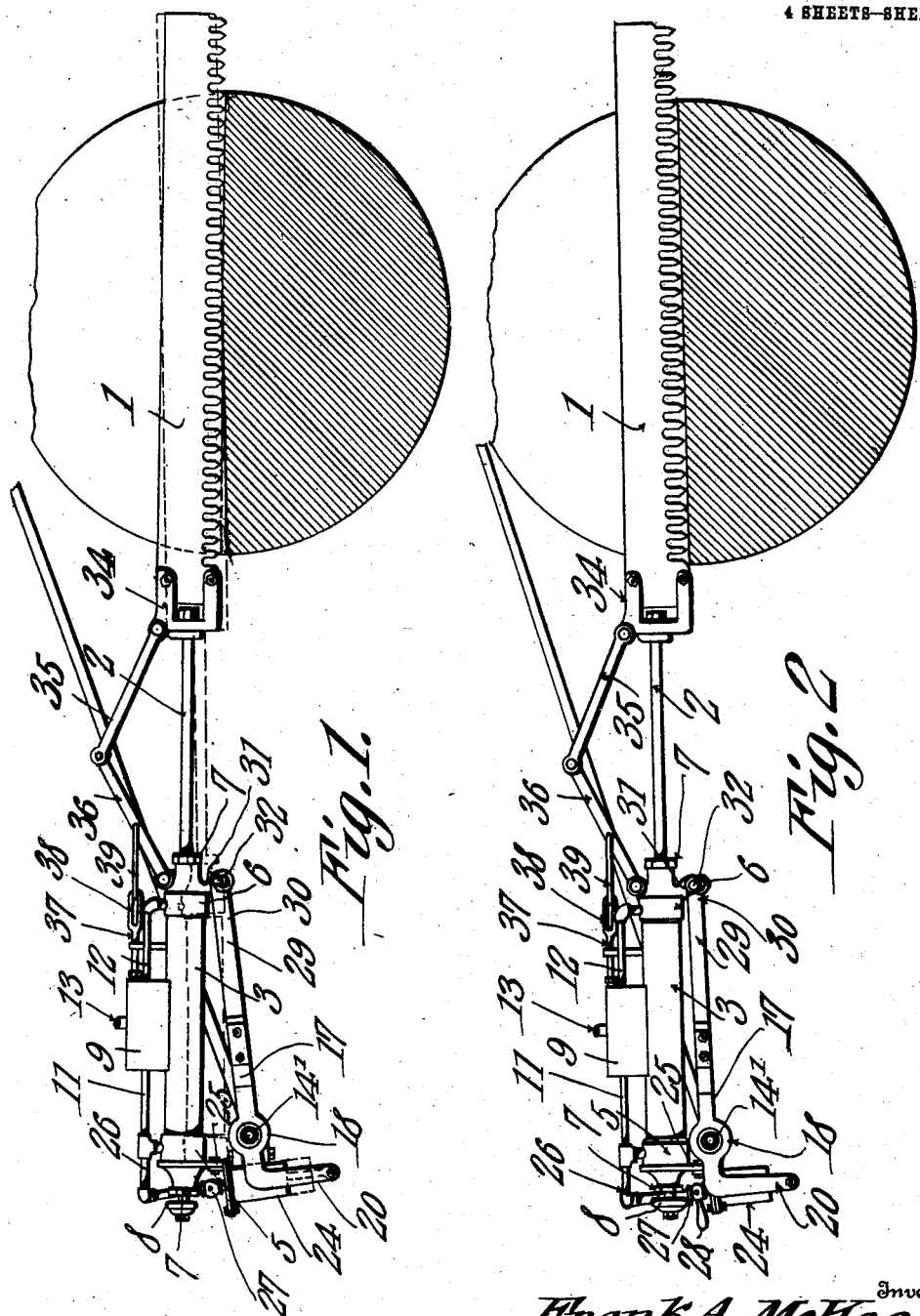
Witnesses
E. R. Stewart
F. T. Chapman
Inventors
Frank A. McKee
Francis R. Horel
By C. A. Snow & Co.
Attorneys

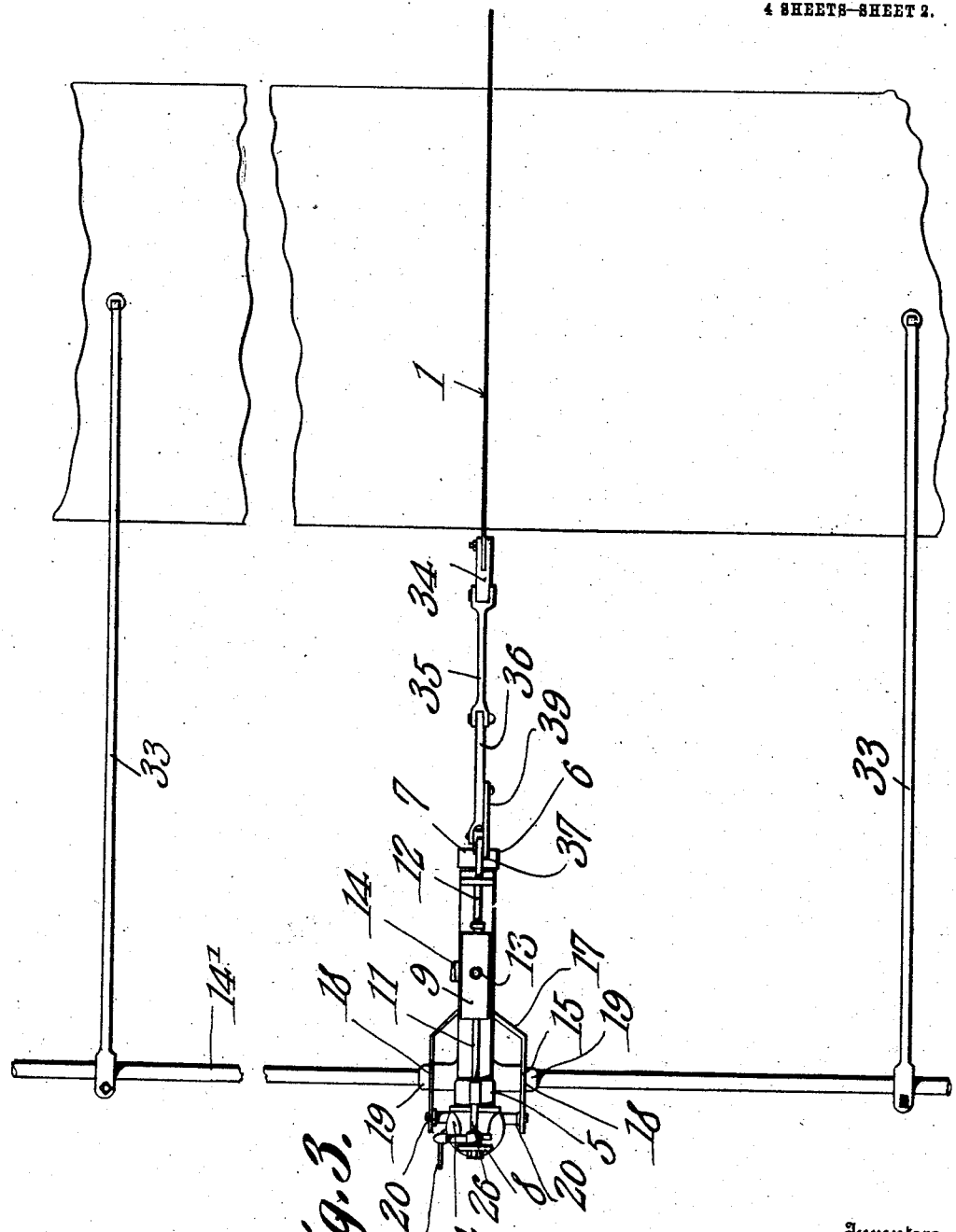

F. A. McKEE & F. R. HOREL.
DRAG SAW MACHINE.
APPLICATION FILED JAN. 25, 1910.
974,168.
Patented Nov. 1, 1910.
4 SHEETS—SHEET 3.
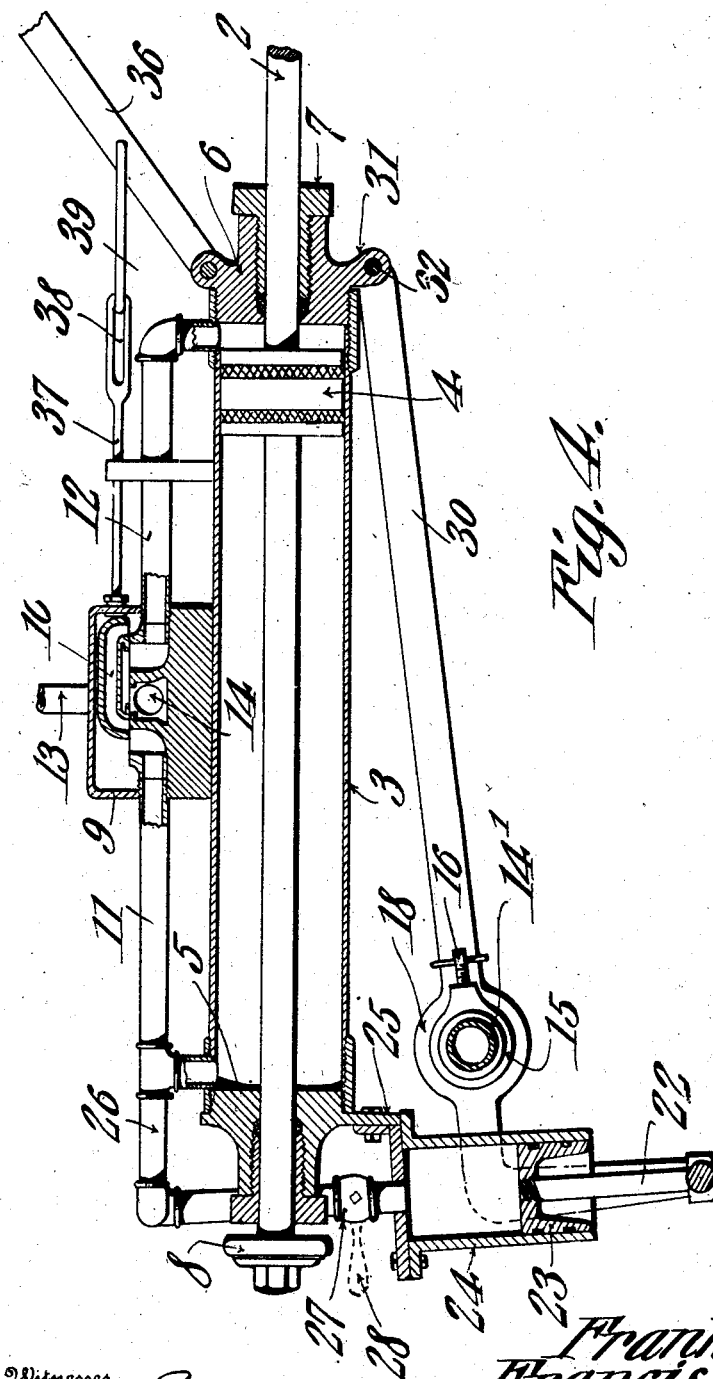

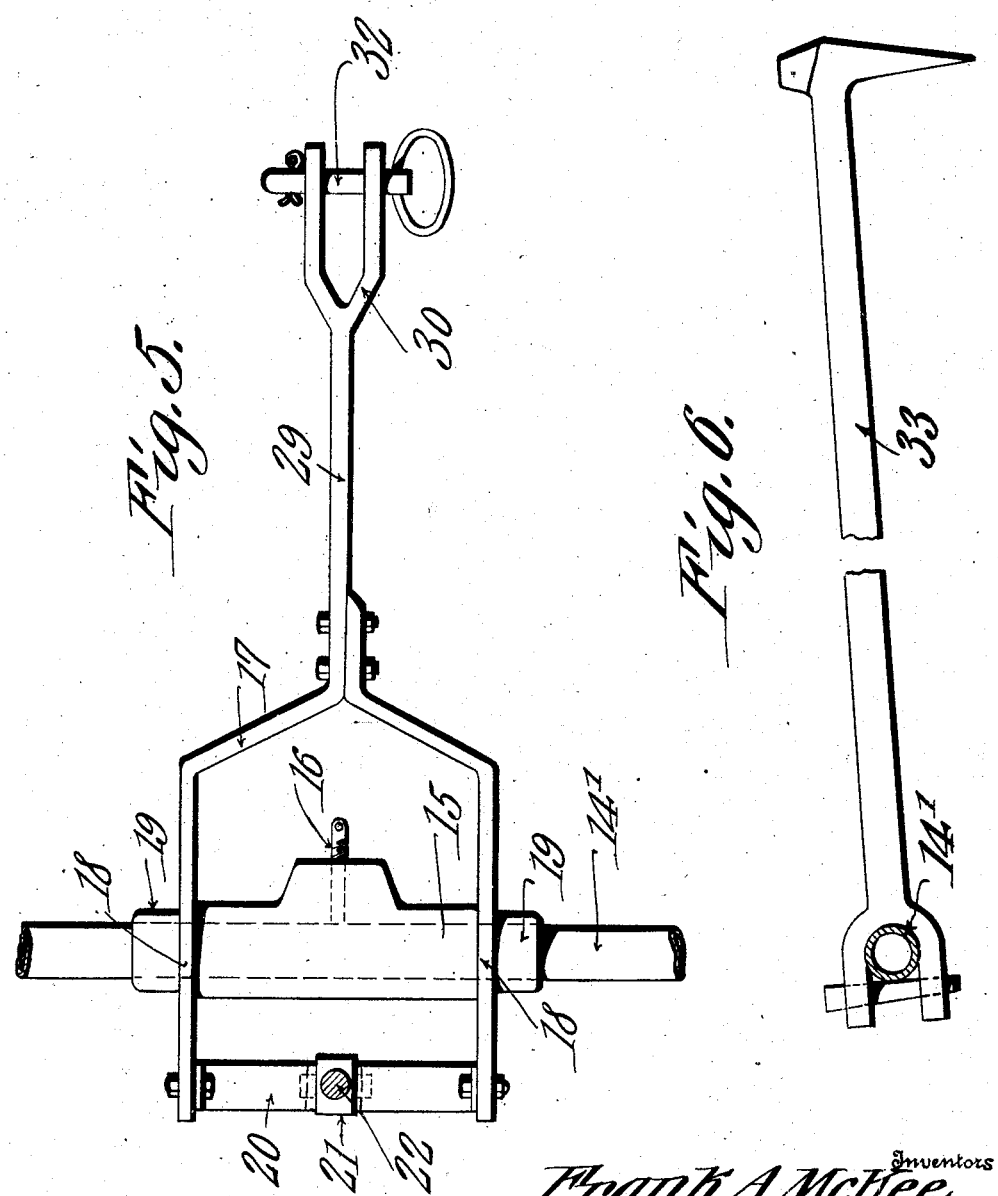

UNITED STATES PATENT OFFICE.

FRANK ALBERT McKEE AND FRANCIS R. HOREL, OF ARCATA, CALIFORNIA.

DRAG-SAW MACHINE.

974,168.     Specification of Letters Patent.      Patented Nov. 1, 1910.

Application filed January 25, 1910. Serial No. 540,006.

*To all whom it may concern:*

Be it known that we, FRANK ALBERT Mc-KEE and FRANCIS R. HOREL, citizens of the United States, residing at Arcata, in the county of Humboldt and State of California, have invented a new and useful Drag-Saw Machine, of which the following is a specification.

This invention has reference to drag saw machines and its object is to produce either a portable or a stationary machine of this character which will operate successfully on large logs for cutting the same into the desired lengths.

The size of a portable machine is limited because of its portability and in stationary machines it is desirable to restrict the size, therefore when operating on logs of large diameter or in felling trees of large size where the diameter exceeds to any considerable extent the stroke of the saw, the saw becomes choked by the saw-dust.

The present invention is designed to avoid this difficulty by providing a means under the control of the operator whereby the saw may be made to clear itself even when the diameter of the log or tree being operated on greatly exceeds the stroke of the saw.

Since it is desirable in order to reduce the weight and size of the machine to construct the same on the simplest lines possible, the saw is directly connected to a reciprocating member driven by compressed fluid such as air or steam, and this device because of its portable or simple nature is of short stroke.

In order to cause the saw to clear itself of accumulated saw-dust where the diameter of the log or tree being operated upon exceeds the length of the stroke of the saw, provision is made for rocking the saw in a plane transverse to the length of the log or tree being cut, such rocking of the saw being automatic but under the control of the operator so that the saw may be caused to rock or to simply reciprocate at the will of the operator.

The invention will be best understood from a consideration of the following detailed description taken in connection with the accompanying drawings forming a part of this specification, in which drawings,—

Figure 1 is a side elevation of the machine in operative relation to a log, and showing the machine during one phase of its operation. Fig. 2 is a similar view showing the machine in another phase of its operation or when the rocking devices are inactive. Fig. 3 is a plan view of the machine in operative relation to a log. Fig. 4 is a longitudinal section of the actuating mechanism for the saw, the showing being on a larger scale than that of the preceding figures. Fig. 5 is a detail plan view of the support for the saw actuating means. Fig. 6 is a detail view of one of the dogs for securing the device to a log.

Referring to the drawings there is shown a saw 1 which may be taken as illustrative of any suitable cross-cut saw for the purposes of the invention. This saw is secured to one end of a piston rod 2 extending through a cylinder 3 and within the cylinder carrying a piston 4. The cylinder is provided with heads 5 and 6 respectively each of which is provided with a packing gland 7 surrounding the piston rod where it passes through the respective head. At the ends the piston rod 2 is provided with elastic buffers 8 which will relieve the shock of impact of the piston with the head of the cylinder as might otherwise occur.

Mounted on the cylinder 3 is a slide valve chest 9 of ordinary construction and within the same is a slide valve 10 also of ordinary construction. The showing of the drawing so far as the slide valve and its chest are concerned may be taken as typical of any suitable structure for the purpose.

Leading from the chest 9 are pipes or conduits 11 and 12 respectively opening into the corresponding ends of the cylinder 3 while fluid under pressure such as compressed air or steam may enter the slide valve chest through a pipe 13 coming from any suitable source. The valve chest 9 is provided with the usual exhaust 14.

With a structure such as described, compressed fluid entering through the pipe 13 will find its way to one end of the cylinder 3 through the pipes 11 or 12 as the case may be, and thereby force the piston 4 toward the other end of the cylinder, the spent fluid in front of the piston finding escape through the other pipe 11 or 12 as the case may be and the exhaust port or opening 14. By the provision of a suitable mechanism the slide valve 10 may be made to act in proper sequence with the movement of the piston 4 and a reciprocatory movement may thereby be imparted to the piston rod 2 and the saw 1 secured thereto. By this means the saw is reciprocated and cuts its way into and through the log being operated upon, the speed of movement of the saw depending upon the power available and the resistance offered to the movement of the saw.

The saw reciprocates in a straight line under the conditions assumed and if the log be comparatively small, the saw will readily clear itself of saw-dust and the cutting will proceed properly. If however it be attempted to cut through a log the diameter of which is materially greater than the stroke of the saw, then the saw becomes quickly choked by accumulated saw-dust and the cutting operation ceases even though the reciprocation of the saw continue. Since the saw structure to be portable, or if stationary, of simple character must needs be of comparatively small size and the stroke of the saw must also be necessarily quite short, the utility of such a saw is limited to the cutting of logs or felling trees of comparatively small diameter.

In order to enlarge the usefulness of a structure such as described the present invention provides means whereby the saw will clear itself even though the diameter of the log operated upon greatly exceeds the length of stroke of the saw.

There is provided a tubular member 14 of sufficient length and on this tube 14 there is mounted a sleeve 15 which may be locked in any position of adjustment along the tube 14 by means of a set screw 16.

Mounted on the sleeve 15 is a yoke 17 having eyes 18 in the legs of the yoke so positioned as to be traversed by ends 19 of the sleeve 15, which ends may be of reduced diameter so that the legs of the yoke abut against shoulders formed at the junction of the reduced portion 19 with the main portion of the sleeve 15.

Secured to the free ends of the legs of the yoke 17 are depending brackets 20 having their ends approaching and in opposition and there carrying trunnions of a block 21 to which is secured a piston rod 22 carrying at the end remote from the block a piston 23 capable of traveling in a cylinder 24 made fast to a bracket 25 on the head 5 of the cylinder 3. Branched off from the pipe 11 is another pipe 26 leading to the cylinder 24 and including a valve 27 which latter is provided with a manipulating handle 28 so that the valve may be readily controlled by an operator.

The yoke 17 is provided with a stem 29 bifurcated at the free end as shown at 30 to straddle an ear 31 on the head 6 of the cylinder 3 and pivotally connected to said ear by a pin 32.

Applied to the tubular member 14 are dogs 33 designed to hold the tubular member in predetermined relation to the log to be operated upon.

In order to cause the proper operation of the slide valve 10 with respect to the reciprocatory movement of the saw, any suitable mechanism may be employed and the particular mechanism shown may be taken as typical of any suitable mechanism, the invention not being confined to the particular structure illustrated.

The piston rod 3 is connected to the saw 2 through a head 34 and this head is coupled to the cylinder head 6 by connected links 35, 36. The slide valve 10 in the particular structure shown may be provided with a rod 37 having its free end formed with an elongated slot 38 entered by a pin on one end of a link 39 pivoted at the other end to the link 36. By this means the reciprocatory movement of the piston rod will cause the actuation of the slide valve 10 for an appropriate distance at the termination of the stroke of the piston in each direction so that steam or compressed air is admitted to the proper end of the cylinder 3 while the other end is open to the exhaust 14. If it be assumed that the valve 27 be of the draining type, then when this valve is closed the interior of the cylinder 24 is open to the atmosphere but when the valve is open then the interior of the cylinder 24 is closed to the atmosphere but is open to the pipe 26.

Let it be assumed that the machine is properly adjusted to a log of moderate diameter, this diameter being less than the stroke of the saw, then the valve 27 remains closed, the cylinder 3 then resting upon the sleeve 15. Under these conditions the saw 1 will be reciprocated by the piston 4 and the saw will clear itself because the stroke is either not exceeded or but slightly exceeded by the diameter of the log being cut. Suppose however that the log be of materially greater diameter than the length of the stroke of the saw, then the operator turns the valve 27 to a position where the pipe 26 is in communication with the interior of the cylinder 24. Now each time steam is admitted to the pipe 11 to drive the piston 4 away from the head 5, then steam is also admitted into the cylinder 24 and drives the piston 23 toward the end of the cylinder 24 away from the cylinder 3 thus raising the corresponding end of the cylinder 3 from the sleeve 15 until the limit of travel of the piston 23 has been reached. The result of this is that the rear end of the saw is elevated and the path of the saw through the log is determined by the extent of elevation of the cylinder from the supporting sleeve 15, the cylinder turning about the pin 32 as a pivot. When the piston 4 has completed its forward stroke, then the slide valve has been moved to a position admitting steam to the other end of the cylinder 3 from that first considered and the first considered end of the cylinder is open to the exhaust, this at the same time opening the pipe 26 and the interior of the cylinder 24 to the exhaust. The structure is so proportioned that the rear end of the cylinder overbalances the saw and consequently the said rear end of the cylinder sinks until arrested by contact with the sleeve 15 thus tilting the saw in the other direction so that the rear end of the saw is lower than the front end of the saw and the consequence is that the bottom of the saw kerf is at an angle where traversed by the saw on the return stroke of the portion of the kerf traversed by the saw on the forward stroke. The saw teeth are therefore lifted from the bottom of the saw kerf through a portion of the length of the latter at each reciprocation of the saw and the saw-dust is thereby removed from the saw teeth and dropped to the bottom of the saw kerf to be engaged by the saw teeth on the next reciprocation of the saw and pushed out of the kerf. Since the cylinder 24 is supplied with compressed fluid during the stroke of the saw in one direction and is emptied of the compressed fluid during the stroke of the saw in the other direction there is imparted to the cylinder 3 and to the saw a rocking motion in the plane of the kerf thereby clearing the saw of saw-dust at each stroke even though the diameter of the log greatly exceeds the length of the stroke of the saw. When the log is of small diameter then the operator has but to close the valve 27 when the piston 23 becomes inactive and the cylinder 3 remains at rest upon the sleeve 15.

In lumber regions and especially in some parts of the United States there are trees ranging from six to twenty feet in diameter and it is practically prohibitive to attempt to provide a stroke of saw approaching in length the diameters named. However by equipping a drag saw with the present invention, the drag saw being of the power driven type, there is produced a very simple machine capable of expeditiously cutting logs or trees of the large diameters named, this being due to the rocking motion imparted to the cylinder and to the saw connected to the piston within the cylinder.

The machine illustrated in the drawings may be variously modified to suit different conditions of use, the showing of the drawings being more particularly directed to a saw structure of the portable type, but this does not preclude the application of the invention to stationary or semi-stationary saw structures. The showing of the drawings is therefore, more or less typical.

What is claimed is:—

1. In a sawing machine, a reciprocating member, a saw attached thereto, a carrier for the reciprocating member, a pivot support for that end of the carrier toward the saw, said pivot support being movable transversely to the movement of the carrier on the support, and power means for rocking the carrier together with the reciprocating member and saw on the pivot support.

2. In a sawing machine, a fluid pressure reciprocatory power member, a saw attached thereto, a carrier for the reciprocatory member, a pivot support for the end of the carrier toward the saw and movable transversely to the movement of the carrier on its pivot and means responsive to fluid pressure for rocking the carrier together with the reciprocatory member and the saw on the pivot support.

3. In a sawing machine, a reciprocatory member, a saw attached thereto, a carrier for the reciprocatory member, a pivot support for the end of the carrier toward the saw and movable transversely to the movement of the carrier on its pivot, a power means for rocking the carrier together with the reciprocating member and saw on the pivot support, and means for rendering the rocking means for the carrier active or inactive at will.

4. In a sawing machine, a fluid pressure reciprocatory engine, a saw attached to the reciprocatory member of the engine, a mounting for said engine on which the latter is pivoted at the end toward the saw for movement on an axis transverse to the direction of reciprocation, the mounting also being movable transversely to the movement of the engine on its pivot, and fluid pressure means causing the rocking of the engine on its pivot at each reciprocation of the saw.

5. In a sawing machine, a reciprocatory power member, a saw attached thereto, a carrier for the reciprocatory member, a pivotal support for the carrier located at the end thereof toward the saw, a pivotal support for the first named pivot support and located with reference to the carrier at the end thereof remote from the first named pivot support, and means for rocking the carrier for the power member and saw on the first named pivot support in timed relation to the reciprocatory movements of the saw.

6. In a sawing machine, a reciprocatory power member, a saw attached thereto, a carrier for the reciprocatory member and saw, a pivotal support for the carrier at the end thereof toward the saw, said pivotal support being movable to feed the saw to the work, power means for rocking the carrier on the pivotal support in timed relation to the reciprocatory movement of the saw, on an axis transverse to the direction of said reciprocatory movement, means for causing the reciprocatory movement of the saw carrying power member, and means for rendering the saw rocking means active or inactive at will.

7. In a sawing machine, a fluid pressure receiving cylinder, a piston therein, means for the introduction of fluid pressure to opposite ends of the cylinder in alternation, a piston rod for the piston, a saw attached to the piston rod, a pivotal support for the saw end of the cylinder in turn pivotally supported adjacent the end of the cylinder remote from the saw, another cylinder carried by the end of the first named cylinder remote from the saw, a piston in the second cylinder directly connected to a relatively fixed part of the apparatus, and direct fluid conduit connections between the second named cylinder and the corresponding end of the first named cylinder.

8. In a sawing machine, a fluid pressure receiving cylinder, a piston therein, means for the introduction of fluid under pressure into opposite ends of the cylinder in alternation, a piston rod in said piston, a saw attached to the piston rod, a pivotal support for the saw end of the cylinder, another pivotal support for the first named pivotal support along which the latter is movable in the direction of the axis of its pivotal movement, another cylinder carried by the end of the first named cylinder remote from the pivot support connection thereto, a piston in the second cylinder directly connected to a fixed portion of the apparatus, direct fluid conduit connections between the second named cylinder and the corresponding end of the first named cylinder, and means included in said connections for cutting off communication between the cylinders at will.

In testimony that we claim the foregoing as our own, we have hereto affixed our signatures in the presence of two witnesses.

FRANK ALBERT McKEE.
FRANCIS R. HOREL.

Witnesses:
WESLEY W. STONE,
CHARLES B. STONE.